June 28, 1938.  A. J. SCHNASE ET AL  2,121,989
COMBINED HANDLE GRIP AND WEAPON
Filed Dec. 1, 1937
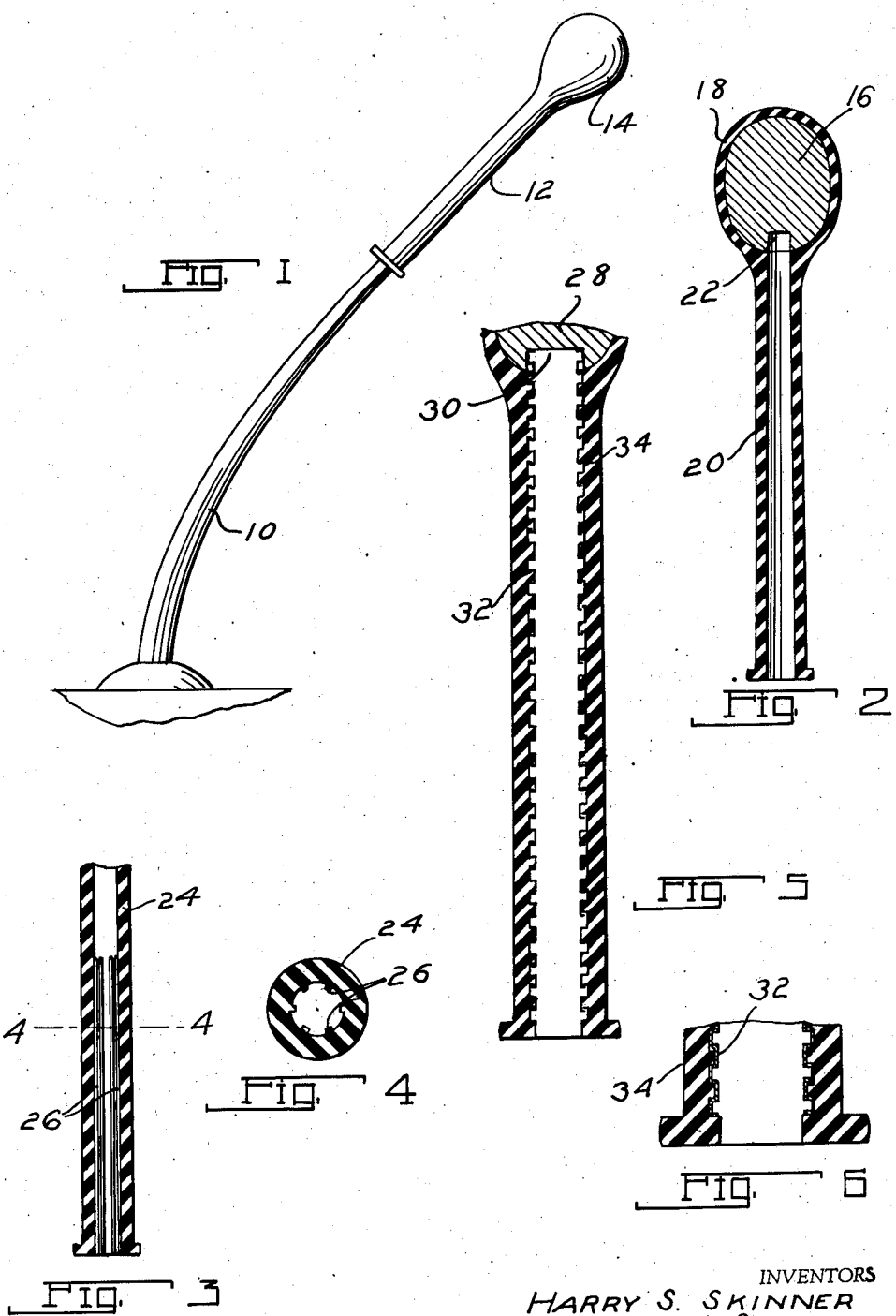
INVENTORS
HARRY S. SKINNER
BY ARTHUR J. SCHNASE
McConkey Dawson & Booth
ATTORNEYS.

Patented June 28, 1938

2,121,989

UNITED STATES PATENT OFFICE 2,121,989

COMBINED HANDLE GRIP AND WEAPON

Arthur J. Schnase and Harry S. Skinner, Chicago, Ill., assignors of one-third to Robert M. Hawk Application December 1, 1937, Serial No. 177,525

8 Claims. (Cl. 74—543)

This invention relates to a combined handle grip and weapon and more particularly to a handle grip for use on a control lever of an automobile which can easily be removed for use as a defensive weapon.

A great many motorists have been held up in the past by bandits jumping on the running boards of their automobiles when they slow down or stop for traffic signals, railroad trains or the like. In a large number of cases attacks of this nature could be repelled by the motorist if he had a weapon of some sort available but ordinarily either he has no defensive weapons whatever or such weapons are not readily accessible.

It is accordingly one of the objects of the present invention to provide a weapon which is readily accessible at all times to an operator or passenger in an automobile or the like.

Another object of the invention is to provide an improved handle grip which is readily removable for use as a weapon. Preferably such handle grip may be employed on a control lever of the automobile such as the gear shift lever, brake lever or the like where it will always be convenient to the operator.

Other objects, advantages and novel features of the invention will be apparent from the following description of the accompanying drawing, in which:

Figure 1 is an elevation of a control lever having a handle embodying the invention;

Figure 2 is a central section through a combined handle grip and weapon according to the invention;

Figure 3 is a partial section similar to Figure 2 showing a modified construction;

Figure 4 is a section on the line 4—4 of Figure 3;

Figure 5 is a partial section similar to Figure 2 showing another modified construction; and Figure 6 is an enlarged partial view similar to Figure 5.

Referring more particularly to Figure 1, the invention is illustrated in connection with a conventional gear shift lever 10 of an automobile although it is to be understood that it might equally well be employed in connection with the brake lever or any other lever accessible from the driver's compartment. Instead of the usual knob or the like on the end of the lever 10 there is provided an elongated sleeve 12 forming a shaft portion and carrying an enlarged head 14 to rest on top of the lever to be grasped by the operator in moving the lever. Preferably the tubular shaft portion 12 has a slip fit over the lever sufficiently tight to hold the head 14 in place during normal shifting movement of the lever but loose enough so that it can readily be removed when desired.

Normally the sleeve 12 and head 14 remain in place on the lever, the head forming a convenient grip for manipulation of the lever by the operator. In the event of a holdup or the like the operator may grasp the shaft portion 12 and slip it off of the lever to be used in the manner of a club or "blackjack". At this time the shaft portion 12 serves as a handle and the head 14 forms a striking member.

Figure 2 illustrates one manner of constructing the novel handle. In this form the head is formed of a substantially ball-shaped member 16 preferably of a suitable metal such as lead, iron, brass or the like. The member 16 is covered with a coating 18 of yielding material such as molded rubber or the like which is continued to form an elongated tubular shaft portion 20. If desired, the ball 16 may have a cavity 22 to receive the end of a control lever to assist in holding the handle in place thereon.

Figures 3 and 4 illustrate a modified construction including a tubular shaft portion 24 of molded rubber or the like having a plurality of integral lugs 26 formed on the interior surface thereof. In use these lugs grip the control lever to hold the shaft portion firmly thereon while permitting easy removal when desired.

In some cases it may be desirable to reinforce the shaft portion and a construction of this kind is shown in Figures 5 and 6. In these figures a metal ball 28 adapted to fit on the end of the control lever is formed with a cavity 30 and one end of a flexible metal tube 32 is brazed or otherwise suitably secured in the cavity. The tube 32 is illustrated as being of the spirally wound type with overlapping slip joints but it will be understood that any suitable type of flexible reinforcement could be used. Both the ball 28 and the tube 32 are covered by an integral coating 34 of rubber or other yielding material.

Preferably the coating 34 continues slightly beyond the end of the tube 32 as best seen in Figure 6 to provide a smooth end finish and a yielding portion engaging and gripping the control lever.

While several embodiments of the invention have been shown and described, it will be understood that various changes might be made therein and it is not intended to limit the scope of the invention to the exact forms shown nor otherwise than by the terms of the appended claims.

What is claimed is:

1. A combined handle grip and weapon comprising a tubular shaft portion adapted to fit over a control lever and an enlarged head portion secured to the shaft portion and forming a grip for operation of the lever.

2. A combined handle grip and weapon comprising an elongated flexible shaft portion adapted to slip over a control lever and an enlarged head member secured to said shaft portion and formed with a cavity to receive the end of the lever.

3. A combined handle grip and weapon comprising a substantially ball shaped member adapted to fit on the end of a control lever, a yielding covering over said member, and means forming an elongated tubular shaft portion connected to said member and adapted to slip over the lever.

4. A combined handle grip and weapon comprising a substantially ball shaped member adapted to fit on the end of a control lever, a yielding covering over said member, and an elongated tubular extension of said covering forming a shaft portion adapted to slip over the lever.

5. A combined handle grip and weapon comprising a substantially ball shaped member adapted to fit on the end of a control lever, an elongated flexible tube secured to said member forming a shaft portion to fit over the control lever, and a yielding coating over said member and tube.

6. A combined handle grip and weapon comprising a substantially ball shaped member adapted to fit on the end of a control lever, a flexible metal tube secured at one end to said ball member and adapted to slip over the lever, and an integral coating of yielding material over the ball member and the tube.

7. A combined handle grip and weapon comprising a tubular shaft portion of molded rubber or the like adapted to slip over a control lever, an enlarged head member secured to said shaft portion, and a plurality of flexible lugs in said shaft portion for frictionally gripping the lever.

8. A combined handle grip and weapon comprising a tubular shaft portion of molded rubber or the like adapted to slip over a control lever, a metallic substantially ball-shaped member adapted to fit on the end of the control lever, and a covering for said member forming an integral continuation of said shaft portion, said shaft portion being so constructed and arranged as to form a handle for using the device as a weapon when it is removed from the control lever.

ARTHUR J. SCHNASE.
HARRY S. SKINNER.